US009519433B2

United States Patent
Jones et al.

(10) Patent No.: US 9,519,433 B2
(45) Date of Patent: Dec. 13, 2016

(54) SECURE VIRTUAL SECTOR ERASURE METHOD AND SYSTEM

(71) Applicant: VSector Security Technologies, LLC, Atlanta, GA (US)

(72) Inventors: Jeffrey A. Jones, Atlanta, GA (US); Michael Lawrence Oken, Atlanta, GA (US); Martin Weber, Atlanta, GA (US)

(73) Assignee: Vsector Security Technologies, LLC, Atlanta, GA (US)

( * ) Notice: Subject to any disclaimer, the term of this patent is extended or adjusted under 35 U.S.C. 154(b) by 0 days.

(21) Appl. No.: 14/711,153

(22) Filed: May 13, 2015

(65) Prior Publication Data

US 2016/0335004 A1 Nov. 17, 2016

(51) Int. Cl.
*G06F 3/06* (2006.01)
*G06F 12/14* (2006.01)
*H04L 9/32* (2006.01)
*G06F 9/455* (2006.01)

(52) U.S. Cl.
CPC ............. *G06F 3/0619* (2013.01); *G06F 3/067* (2013.01); *G06F 3/0608* (2013.01); *G06F 3/0641* (2013.01); *G06F 3/0665* (2013.01); *G06F 9/45558* (2013.01); *G06F 12/1475* (2013.01); *H04L 9/3239* (2013.01); *G06F 2009/45562* (2013.01); *G06F 2009/45587* (2013.01); *G06F 2212/1052* (2013.01)

(58) Field of Classification Search
CPC ..... G06F 3/0665; G06F 3/0641; G06F 3/0608
See application file for complete search history.

(56) References Cited

U.S. PATENT DOCUMENTS

| 5,265,159 | A | 11/1993 | Kung |
| 5,931,904 | A | 8/1999 | Banga et al. |
| 5,991,778 | A | 11/1999 | Starek et al. |
| 6,070,174 | A | 5/2000 | Starek et al. |
| 6,154,811 | A | 11/2000 | Srbljic et al. |
| 6,314,437 | B1 | 11/2001 | Starek et al. |
| 7,275,139 | B1 | 9/2007 | Tormasov et al. |
| 7,475,203 | B1 | 1/2009 | Petrillo et al. |
| 7,526,620 | B1 | 4/2009 | McGovern |

(Continued)

OTHER PUBLICATIONS

Kissel et al, NIST Special Publication 800-88, "Guidelines for Media Sanitization", NIST, Revision 1, 2014, pp. 1-64.*

(Continued)

*Primary Examiner* — Hadi Armouche
*Assistant Examiner* — Ali Shayanfar
(74) *Attorney, Agent, or Firm* — Meunier Carlin & Curfman LLC

(57) ABSTRACT

Systems and methods for sanitizing physical storage in cloud computing and virtual environments. When logical storage is decommissioned in a virtual environment, the underlying physical storage is logically disassociated. However, the underlying physical data blocks remain intact until they are overwritten. Since there is no control over when, or even if, the physical data is ever overwritten, the remaining data is susceptible to compromise. The present disclosure provides a secure erase application that securely erases physical storage associated with to-be deleted resources, such as virtual data stores, virtual images, snapshots and raw virtual disks.

25 Claims, 7 Drawing Sheets

(56) References Cited

U.S. PATENT DOCUMENTS

| | | | |
|---|---|---|---|
| 7,650,473 B1 | 1/2010 | Tormasov et al. | |
| 7,668,883 B2 | 2/2010 | Tran et al. | |
| 7,930,494 B1 | 4/2011 | Goheer et al. | |
| 7,975,119 B2 | 7/2011 | Erez | |
| 8,024,532 B2 | 9/2011 | Taguchi et al. | |
| 8,108,599 B2 | 1/2012 | Rector et al. | |
| 8,130,554 B1 | 3/2012 | Linnell | |
| 8,504,532 B2 | 8/2013 | Saxena et al. | |
| 8,812,563 B2 | 8/2014 | Zaitsev | |
| 2003/0196036 A1 | 10/2003 | Gibble et al. | |
| 2004/0188710 A1 | 9/2004 | Koren et al. | |
| 2006/0080554 A1 | 4/2006 | McDonald et al. | |
| 2006/0117153 A1 | 6/2006 | Tran et al. | |
| 2007/0214316 A1 | 9/2007 | Kim | |
| 2008/0140910 A1 | 6/2008 | Flynn et al. | |
| 2008/0201392 A1 | 8/2008 | Nakajima et al. | |
| 2008/0201544 A1* | 8/2008 | Nakajima | G06F 3/061 711/166 |
| 2009/0070404 A1* | 3/2009 | Mazzaferri | G06F 9/542 709/202 |
| 2009/0172250 A1 | 7/2009 | Allen et al. | |
| 2009/0319720 A1 | 12/2009 | Stefanus et al. | |
| 2010/0174865 A1 | 7/2010 | Koester | |
| 2010/0198972 A1* | 8/2010 | Umbehocker | G06F 3/0604 709/226 |
| 2012/0030306 A1* | 2/2012 | Kami | G06F 3/0617 709/213 |
| 2012/0266162 A1 | 10/2012 | Baron | |
| 2012/0278564 A1 | 11/2012 | Goss et al. | |
| 2013/0212129 A1* | 8/2013 | Lawson | G05B 19/4185 707/779 |
| 2014/0068340 A1 | 3/2014 | Dayal et al. | |
| 2014/0101117 A1* | 4/2014 | Uzzaman | G06F 17/30303 707/694 |
| 2014/0149794 A1* | 5/2014 | Shetty | H04L 67/1095 714/20 |
| 2014/0201489 A1* | 7/2014 | Deguchi | G06F 12/0246 711/170 |
| 2015/0006691 A1 | 1/2015 | Satapathy | |
| 2015/0222564 A1* | 8/2015 | Wheeler | G06F 9/45533 709/226 |
| 2015/0319088 A1* | 11/2015 | Wenig | H04L 45/745 370/392 |
| 2016/0087946 A1* | 3/2016 | Yang | G06F 21/62 713/171 |

OTHER PUBLICATIONS

Perito, et al., "Secure Code Update for Embedded Devices via Proofs of Secure Erasure".

Huang, et al., "Survey on securing data storage in the coud", APSIPA Tansactions on Signal and Information Processing, vol. 3, 2014.

Paul, et al., "Proof of Erasability for Ensuring Comprehensive Data Deletion in Cloud Computing".

* cited by examiner

SECURE VIRTUAL SECTOR ERASURE METHOD AND SYSTEM

BACKGROUND

The advent of the cloud and virtualization of computing environments has led to new ways of storing data. Computer algorithms store data virtually across many different machines and Storage Media. For example, a single file containing a single data instance is stored using a virtual identifier. The virtual identifier is an identifier—like a serial number—that is unique across multiple machines.

The data could be sensitive confidential information like all of the HR files for an organization or user data for a large gaming company. The data is spread across multiple physical devices in one or more data centers using the virtual identifier. Without the virtual identifier, the data owner cannot access the data.

Currently, users delete cloud or virtual data by merely deleting the virtual identifier. Deletion of the virtual identifier disconnects the users of the cloud or virtual environment from the data stored at the physical locations (e.g., on hard drives). A problem arises, however, in that the data itself still exists at those physical locations. Someone with access to those physical locations (either physically or through a network) may be able to access the data. Thus, the data owner has no reassurance that the data has been securely deleted.

SUMMARY

Disclosed herein are systems and methods for providing secure erasing of virtual resources. In accordance with an aspect of the disclosure, there is a secure erasing method that includes presenting a virtual resource in a user interface; receiving a selection of the virtual resource, the selection indicating that the virtual resource is to be securely erased; isolating the selected virtual resource; obtaining access to the selected virtual resource; and securely erasing the selected virtual resource by overwriting all virtual sectors of the selected virtual resource.

In accordance with another aspect of the disclosure there is disclosed a method that includes authenticating a user to present virtual resources in accordance with privileges associated with the user; receiving a selection of a virtual resource to be securely erased; mounting the selected virtual resource with an exclusive lock; computing a first hash value for same sized zero-byte data file as the selected resource; reading virtual disk sectors associated with the selected resource; determining a second hash value of the selected resource from the virtual sectors read; overwriting the selected virtual resource; and verifying that the selected resource was erased by determining a third hash value from the virtual sectors read and comparing it to the first, computed hash value.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for providing a highly scalable, fault tolerant remote access architecture and methods for connecting clients to remotely accessed applications and services provided by the remote access architecture, it will become evident to those skilled in the art that the implementations are not limited thereto.

Overview of the Disclosure

The present disclosure is directed to systems and methods for secure erasure of virtual sectors that are physically located in storage in cloud computing and virtual environments. When logical storage is decommissioned in a virtual environment, the underlying physical storage is logically disassociated. However, the underlying physical data blocks remain intact until they are overwritten. Since there is no control over when, or even if, the physical data is ever overwritten, the remaining data is susceptible to compromise. The present disclosure provides a secure erase application that securely erases physical storage associated with to-be deleted resources, such as, but not limited to, virtual data stores, virtual images, snapshots and raw virtual disks.

EXAMPLE IMPLEMENTATION

Figure 1:
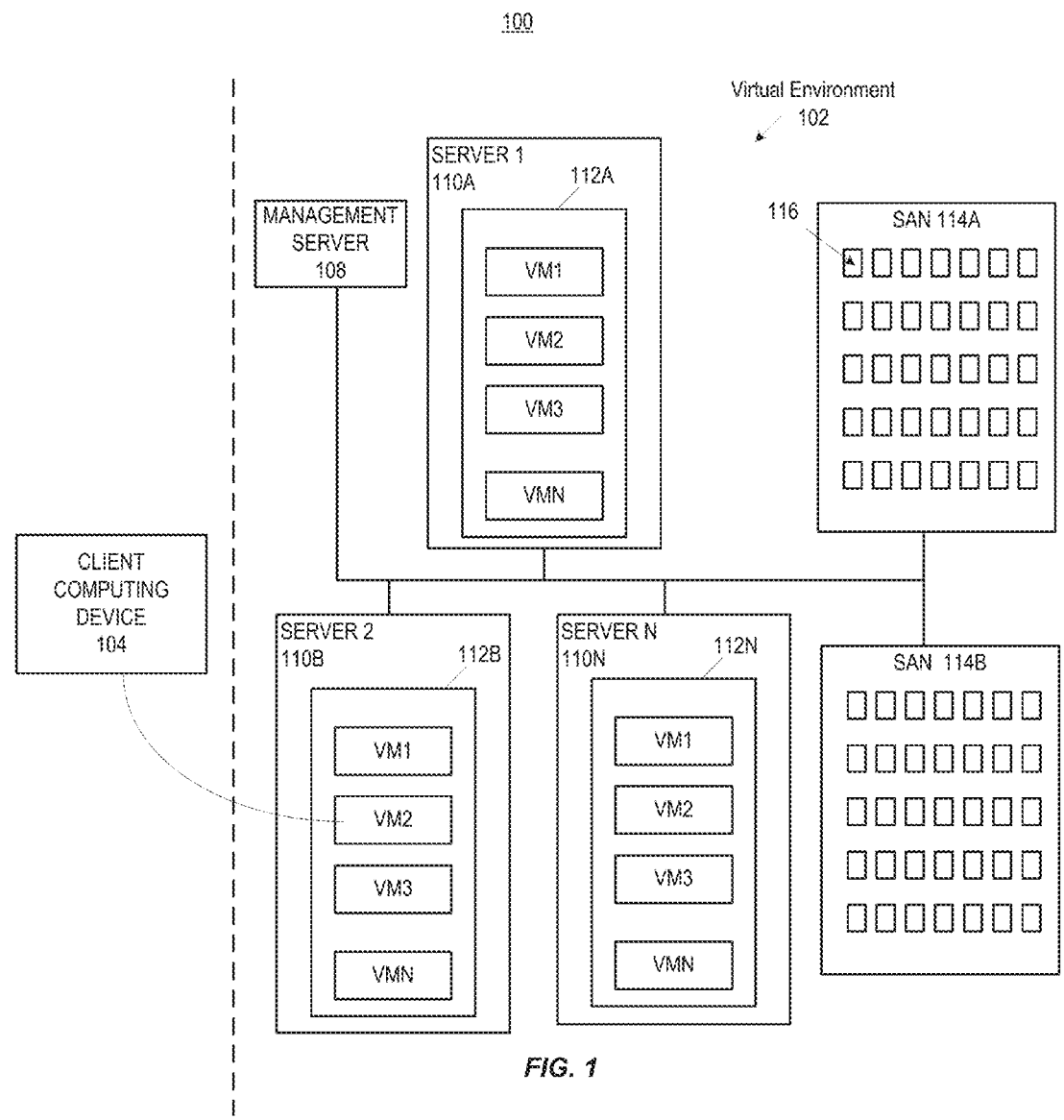
FIG. 1 illustrates an example environment in which the present disclosure may be implemented.

With reference to FIG. 1, there is illustrated an example environment 100 in which the present disclosure may be implemented. A virtual environment 102 includes virtual machine monitors 112A, 112B . . . 112N running on respective physical servers 110A, 1106 . . . 110N, that are each connected to a storage area networks (SAN) 114A, 114B. The servers 110A, 1106 . . . 110N may be industry standard servers having a general configuration shown in FIG. 7 that run a virtualization layer that abstracts processor, memory, storage and networking resources that are provisioned to multiple virtual machines. An example virtualization layer is VMware ESX Server. In some virtual environments 102, the servers 110A, 1106 . . . 110N can be grouped together with connections to the same network and storage subsystems to provide a cluster.

The SANs 114A, 114B may be large storage arrays of any type having a large number of physical disks 116. The SANs 114A, 114B may be shared between one or more of the servers via 110A, 1106 . . . 110N to provide for aggregation of the storage resources and to provide flexibility in provisioning the resources to virtual machines. The physical disks of the SANs 114A, 114B may be divided into logical unit numbers (LUNs) that are presented to virtual resources within the virtual environment 102. The SANs 114A, 114B may implement RAID10 (or other RAID variation) to protect from data loss through individual disk failures, as well as to increase I/O throughput. As such, virtual objects are "striped" over a multitude of disks (see, FIG. 6). The actual physical locations of the data blocks that make up any virtual object are abstracted and therefore hidden to the virtual environment 102. However, this also means that command sets supported by individual disks, e.g. SCSI SANITIZE are not available.

A management server 108 provides a single point of control in the virtual environment 102. The management server 108 provides services, such as access control, performance monitoring and configuration.

The virtual machine monitors 112A, 112B . . . 112N are each a virtual representation of the computing and memory resources of its corresponding server, 110A, 110B . . . 110N. Data stores (DS1, DS2, DS3 shown in FIG. 5) are virtual representations of combinations of underlying physical storage resources in the virtual environment 102. Virtual machines (VM1, VM2, VM3 . . . VMN) are designated to a particular virtual machine monitor 112A, 112B, or 112N (or cluster) and a data store when they are created. In some virtual environments 102, virtual machines can be migrated from one server to another.

Users can access a particular virtual machine from using a client computing device 104 using a client application, a Web browser, or terminal services. For example, as shown in FIG. 1, the client computing device 104 is accessing VM2 running in virtual host 2 of server 110B. The client computing device 104 may have the configuration shown in FIG. 7.

Figure 2:
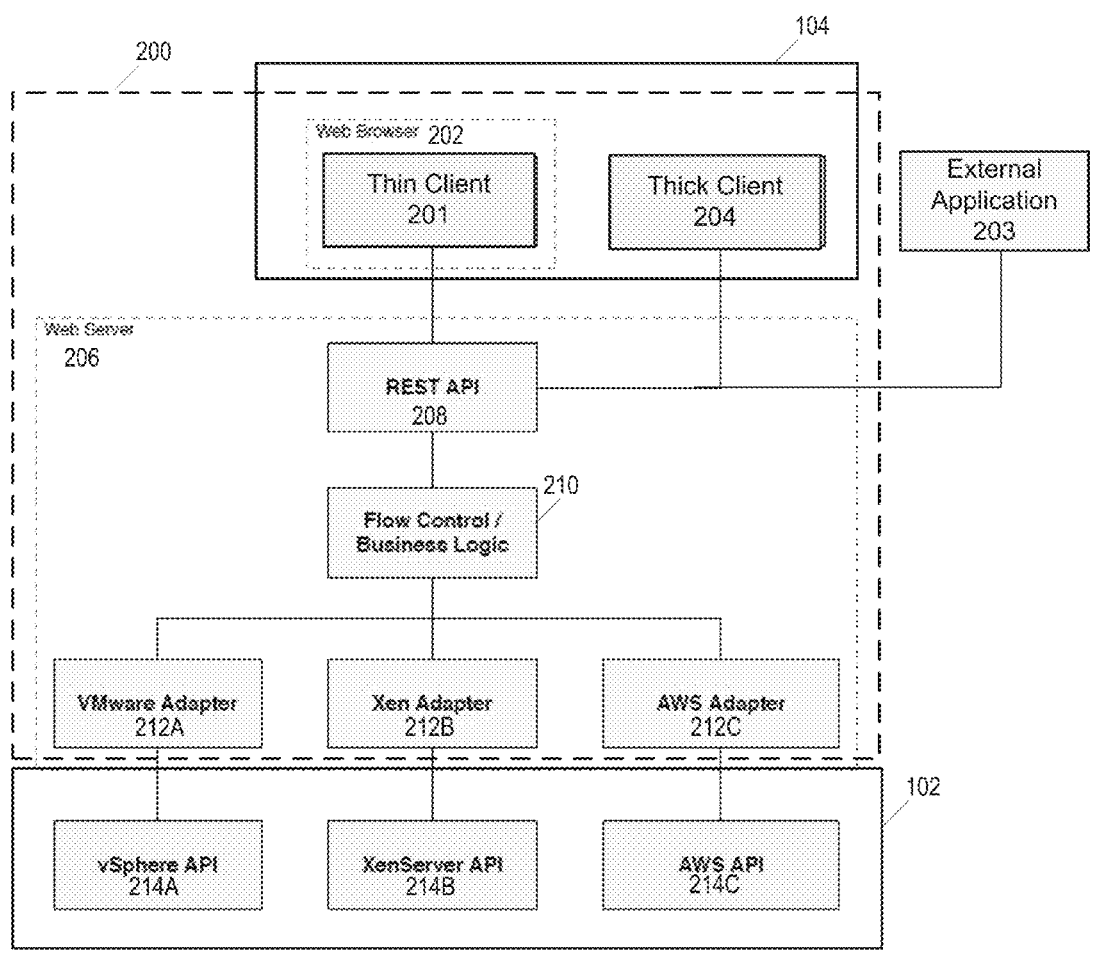
FIG. 2 illustrates example components of a secure erase application of the present disclosure that may be implemented in the environment of FIG. 1.

With reference to FIG. 2, in accordance with aspects of the present disclosure, a user desirous of securely erasing a virtual resource (e.g., VM2) may be provided with a secure erase application 200 that securely erases resources within in the virtual environment 102. The secure erase application 200 may be hosted at a web server 206 running on a virtual machine in the virtual environment 102, and accessed by e.g., a thin client 201 and/or Web browser 202 at a predetermined Uniform Resource Locator (URL). Once accessed, the secure erase application 200 is presented to a user in a thick client 204. The thin client 201 and/or Web browser 202 communicates with flow control/business logic 210 via an API 208, as described below.

In some implementations, an external application 203 (e.g., a thick client) may be used instead of, or in addition to, the thin client 201 and/or thick client 204. The external application may directly call the API 208 on the web server 206 to perform the functions described below.

Figure 3:
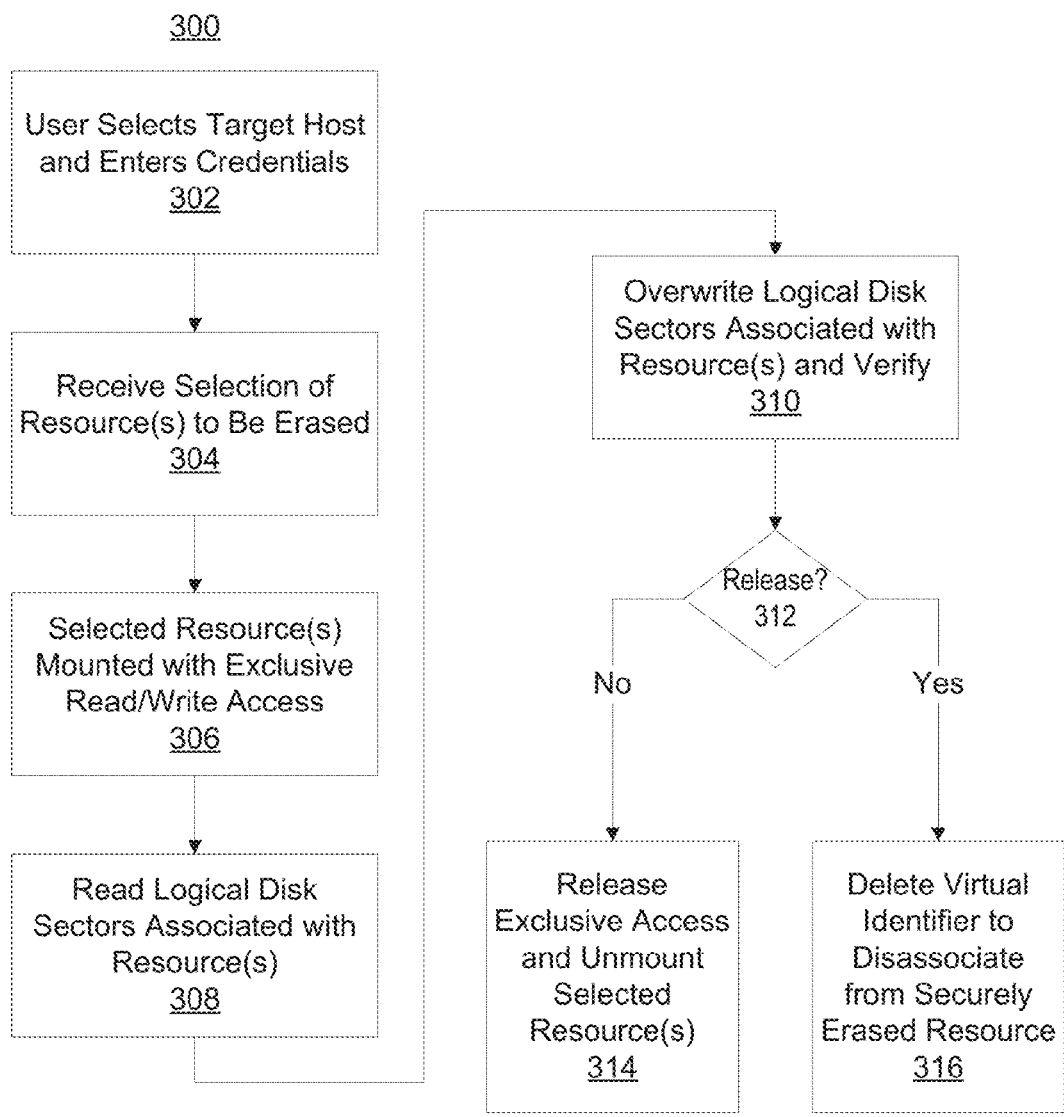
FIG. 3 illustrates an example operational flow performed by the secure erase application.

In each of the above implementations (i.e., accessing by the thin client 201, thick client 204 or external application 203), the secure erase application 200 operatively controls the secure erase process in accordance with flow control/business logic 210 that is detailed more fully in FIG. 3. Adapters 212A, 212B, 212C are provided to interact with specific types of virtual environments 102, e.g., VMWARE, XEN, AMAZON, GOOGLE, MICROSOFT, RACKSPACE, HYPERV and others. While FIG. 2 shows three adapters, any number of adapters may be provided. The adapters 212A, 212B, 212C may be multithreaded, and each may call a corresponding API 214A, 214B, 214C to implement the secure erase operates within a particular virtual environment 102. The operations performed by the flow control/business logic 210 may be the same for any or all virtual environments 102, as the adapters logically abstract the specifics of the virtual environment 102 from the logic of the flow control/business logic 210.

In FIG. 2, the secure erase application 200 (by the flow control/business logic 210) provides erasure instructions over the entire logical storage (the virtual disk sectors) of the resource to be deleted. This may be over, e.g., two read and three write cycles. Performance will be enhanced if the secure erase application 200 is deployed as close as possible to the underlying physical storage (e.g., SAN 114A). As such, the secure erase application 200 may be deployed in any virtual machine in the virtual environment 102, the management server 108. If the secure erase application 200 cannot be deployed in the virtual environment 102, it may be operated over a LAN or WAN.

Figure 4:
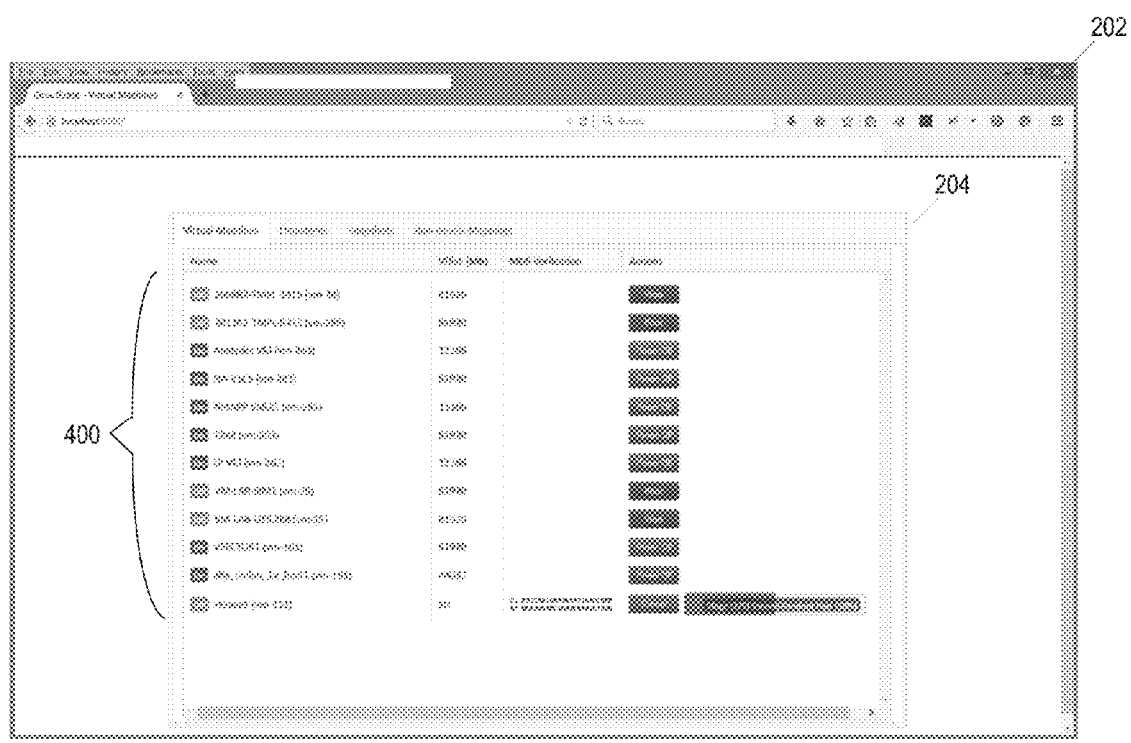
FIG. 4 illustrates an example user interface presented by the secure erase application.

FIG. 3 illustrates an example operational flow 300 performed by the secure erase application 200. At 302, a user enters target host (IP address/optionally port/host name) and credentials. The target host and credentials may be entered into the thin client 201 or the thick client 204. Once authenticated, the user may be presented the example user interface shown in FIG. 4. Virtual resources 400 associated with the target host for which the supplied user credentials have alter/delete privilege are displayed. Each resource is uniquely identified within its context. The target host may any one of servers 110A, 110B . . . 112N having one or more virtual machines executing within its virtual machine monitor 112A, 112B . . . 112N, or the management server 108 for the virtual environment 102.

At 304, the user selects a virtual resource to be erased. Depending on the type of virtual resource (or object) the hypervisor product or cloud provider supports and that are exposed through their respective APIs, the following types of resources may be selected for secure erasure in accordance with the present disclosure. The virtual resources include, but are not limited to: virtual data stores, virtual images (bootable images containing an operating system; snapshots (saved backups of changes to a virtual image); and raw virtual disks (a mountable disk image). The hierarchy of these resources may be as follows:
  Data Store->Virtual Machine->Snapshots
  Data Store->Raw Virtual Disk
  Each erasure of a virtual resource will generate a separate job running on its own dedicated thread to perform secure erasing.

At 306, the secure erase application 200 mounts/opens the selected virtual resource(s) with exclusive read/write access (an exclusive lock). In case of data stores and virtual disks, if an exclusive lock cannot be obtained, the operational flow 300 may wait and retry for a user-definable period of time or amount of tries. In case of running virtual machines, a stop command may be issued and the process will continue after the virtual machine is powered down. If the virtual environment 102 supports dynamic redistribution of resources, this feature will be disabled to ensure uninterrupted operation. Also at 306, a hash value is determined for same sized zero-byte data file as the selected resource. The hash value may be an MD5 hash value. Other hash values may be used. For example, if the selected resource is 10 MB (e.g., 10,485,760 bytes), the MD5 hash of a zero-byte 10 MB data file is determined and saved as a first hash value. The first MD5 hash value is used as part of a verification process performed in 310.

At 308, the virtual disk sectors associated with each selected resource are read. A second MD5 hash value of the selected resource is determined. The second MD5 hash value will be different than the first MD5 hash value if there is data in the selected resource.

Figure 5:
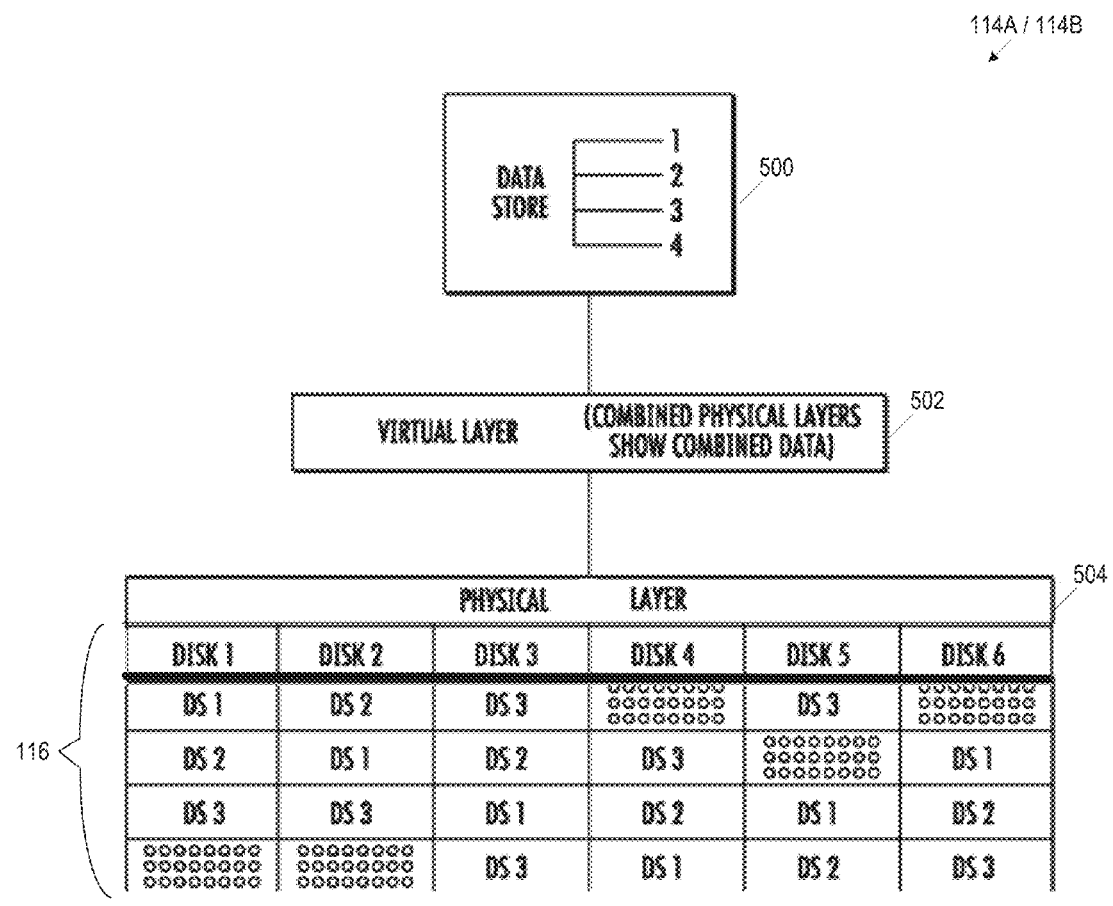
FIG. 5 shows additional details of a storage area network (SAN)
Figure 6:
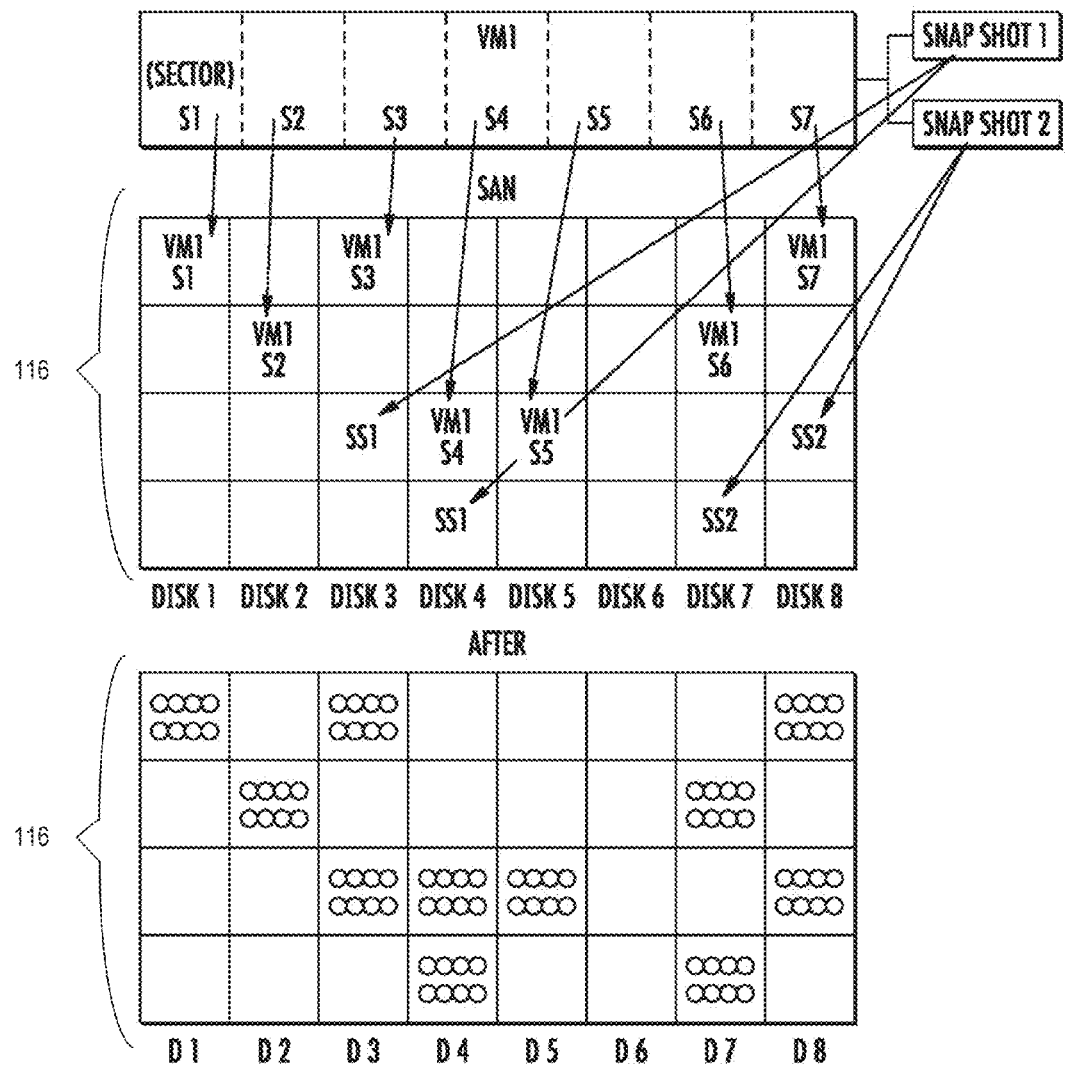
FIG. 6 shows additional details of storage of virtual resources.

At 310, the secure erase application overwrites the selected virtual resource. As noted above, virtual resources are stored in data stores that are physically located on the SAN 114A and/or 114B. Reference is now made to FIG. 5, which shows additional details of the SAN 114A (or 114B). The SAN 114A is exposed within the virtual environment 102 as the data store 500. A virtual layer 502 abstracts a physical layer 504 comprised of the physical disks 116. As shown in FIG. 6, resources, such as VM1 and its associated snapshots may be spread across many physical disks 116. Thus, at 310, a three pass process may be used, for example, to securely erase data on each of the physical disks on which the virtual resource resides. In a first pass, the secure erase application 200 overwrites all the virtual disk sectors with random bits. In a second pass, the secure erase application 200 overwrites all the virtual disk sectors with another set of random bits. In a third pass, the secure erase application 200 overwrites all the virtual disk sectors with zero bits. It is noted that any number of passes may be used at 310. The "After" portion of FIG. 6 illustrates the zeroed sectors on the physical disks 116.

To verify that the selected resource was erased, the secure erase application 200 reads all the virtual disk sectors and calculates a third MD5 hash value. If the resource was successfully securely erased, then a comparison of the third MD5 hash value to the first MD5 hash value will result in an identical value. If the comparison of third MD5 hash value to the first MD5 hash value results in different values, then it is determined that there is a failure of the secure erase process. A failure may be reported (see below) to the user or the process at 310 may be rerun.

At 312, it is determined if the select resource(s) is to be permanently released for reuse in the virtual environment 102. If not, then at 314, the secure erase application 200 releases the exclusive lock(s) and unmounts/closes the selected resource(s). The selected resource(s) would remain available to the user, however in a sanitized condition. If the selected resource(s) is to be permanently released at 312, then at 316, the virtual identifier of the selected resource(s) is disassociated from the selected resource(s) and the selected resource(s) is made available for reuse within the virtual environment 102. After either 314 or 316, if the virtual environment 102 supports dynamic redistribution of resources, the secure erase application 200 will re-enable this feature.

At the end of the operational flow 300, a "Certificate of Sanitization" report may be generated in accordance with NIST 800-88, revision 1, containing the following, non-limiting information:

Person performing sanitization
Date and Time
Object type and unique Identifier
Sanitation method (e.g., "Clear" or "Purge")
Specify method details (e.g., 2 random overwrites, 1 zero overwrite)
Verification Method ("Full", original MD5 hash, computed MD5 hash, secure erase MD5 hash+indicator for computed and original hash being identical) "VSector Security Technologies" electronic validation stamp In the operational flow 300, there are certain considerations that may be made if, for example, the selected resource exists on a solid-state disk drive (SSD). Unlike with magnetic media, there is no "ghosting" of data on SSDs. As such a single pass of zeros may be used to securely erase virtual sectors associated with the selected resource. Furthermore, a three-pass (or more) overwrite process may shorten the life span of the SSD. It is noted that enterprise-class SSDs implement wear-leveling algorithms that do not guarantee that a physical block will be overwritten in place. As this feature cannot be bypassed, the Certificate of Sanitization may include a disclaimer.

With respect to the virtual environment 102 itself, if there are active/passive hosts in the virtual environment 102, the operational flow 300 of the secure erase application 200 may be run on the passive node. From a storage perspective, the secure erase application 200 may provide three non-limiting settings:

"Idle time" priority—least intrusive, throttles to only perform disk operations when it does not interfere with higher priority operations.
"Standard" priority—balanced between quick erase and resource consumption.
"High" priority—no throttling, the secure erasure application operates with no impediments.

The secure erase application 200 may detect if thin provisioning is used. If so, the secure erase application 200 only erases what has been provisioned at the time of the erase operation.

Some virtual environments 102 support automatic relocation of virtual storage based on configurable triggers. Once a copy process has been completed and the virtual storage relocated, pointers are redirected to the new location. However, while the original data has been disassociated, it is still physically present. In accordance with aspects of the present disclosure, the secure erase application 200 is notified of any such event and a secure erase operation of the original virtual storage is also initiated.

Finally, it will be understood that the present disclosure may be implemented in both private clouds, i.e. hypervisor products such as VMWARE, XEN, and HYPER-V, as well as public cloud providers such as AWS, GOOGLE CLOUD, AZURE and OPENSTACK.

Figure 7:
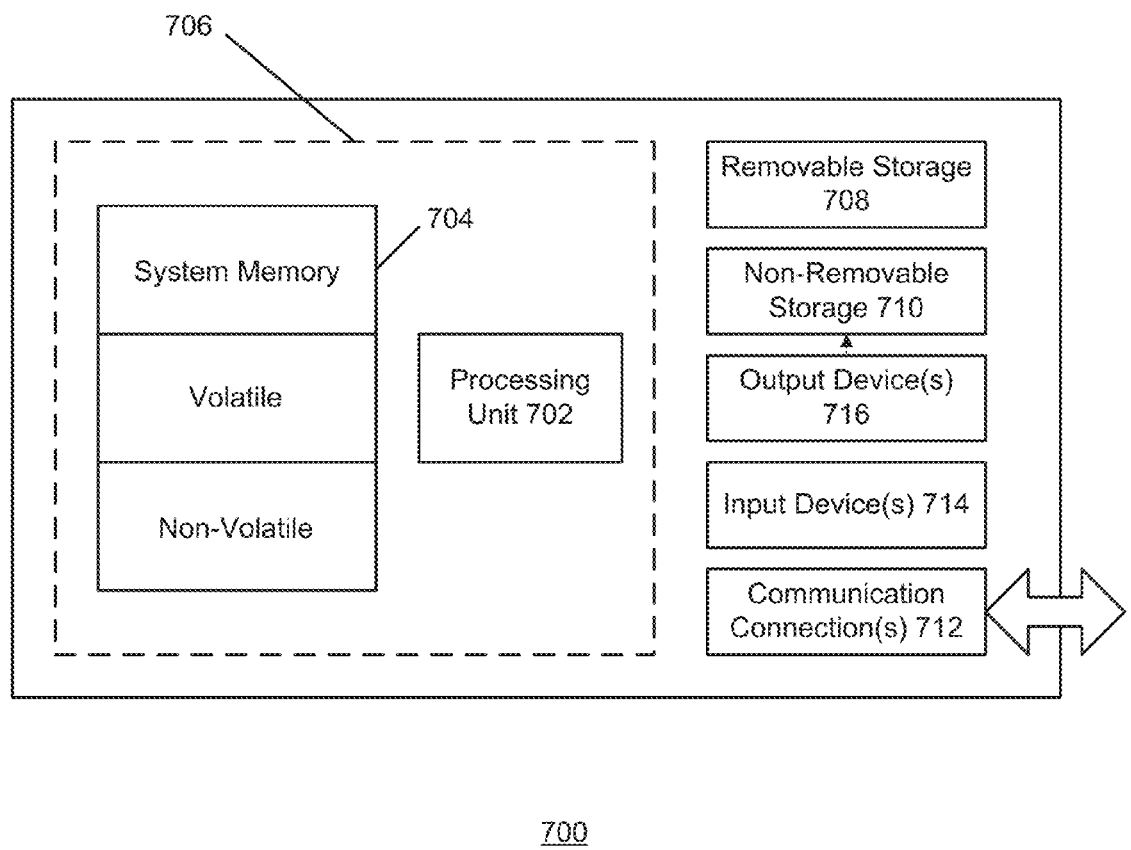
FIG. 7 shows an example computing device.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, servers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of tangible computer readable media. Computer readable media can be any available tangible media that can be accessed by device 700 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communications connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   presenting a virtual resource in a user interface;
   receiving a selection of the virtual resource, the selection indicating that the virtual resource is to be securely erased;
   isolating the selected virtual resource, wherein the isolating comprises:
      exclusively locking the selected virtual resource,
      stopping execution of virtual machine processes associated with the selected virtual resource, and
      disabling a dynamic redistribution of resources to ensure uninterrupted operation;
   obtaining access to the selected virtual resource;
   securely erasing the selected virtual resource by overwriting all virtual sectors of the selected virtual resource; and
   confirming that all virtual sectors of the selected virtual resource have been overwritten.

2. The method of claim 1, further comprising mapping the overwriting to a physical layer associated with the virtual sectors of the selected virtual resource.

3. The method of claim 2, wherein mapping the overwriting is contemporaneous with the overwriting of the virtual sectors.

4. The method of claim 1, further comprising issuing a certificate of sanitization indicating secure erasure of the selected virtual resource.

5. The method of claim 1, further comprising dereferencing a unique identifier of the selected virtual resource, thereby disassociating a logical layer having the selected virtual resource from the physical layer.

6. The method of claim 5, wherein dereferencing the unique identifier is after overwriting all virtual sectors of the selected virtual resource.

7. The method of claim 1, wherein overwriting all virtual sectors of the selected virtual resource includes overwriting in compliance with a NIST 800-88 standard.

8. The method of claim 7, wherein overwriting all virtual sectors of the selected virtual resource includes overwriting with two passes of random bits and one pass of zero bits.

9. The method of claim 1, wherein the confirming that all virtual sectors of the selected virtual resource have been overwritten uses a hash value.

10. The method of claim 9, the confirming comprising comparing a first hash value determined from a similarly sized zero-byte data file as the selected virtual resource to another hash value of the selected virtual resource after the overwriting.

11. The method of claim 1, further comprising receiving a target host and user credentials.

12. The method of claim 11, further comprising identifying access privileges identified with the user credentials and wherein presenting the virtual resource in accordance with the access privileges.

13. The method of claim 12, wherein presenting virtual resource corresponding to the access privileges includes presenting only if the user has alteration or deletion privileges.

14. The method of claim 1, further comprising determining an environment processing capacity and throttling the overwriting based on the environment processing capacity.

15. The method of claim 1, further comprising identifying the virtual sectors based on usage in an environment distinguishing between allocation and usage.

16. The method of claim 1, further comprising installing an application for performing the method into a user environment.

17. A non-transitory computer readable storage medium programmed with computer readable code that, when executed by a computer processor, causes the processor to:
   present a virtual resource in a user interface;
   receive a selection of the virtual resource, the selection indicating that the virtual resource is to be securely erased;
   isolate the selected virtual resource, wherein to isolate the selected virtual resource, the processor:
      exclusively locks the selected virtual resource,
      stops execution of virtual machine processes associated with the selected virtual resource, and
      disables a dynamic redistribution of resources to ensure uninterrupted operation;
   obtain access to the selected virtual resource;
   securely erase the selected virtual resource by overwriting all virtual sectors of the selected virtual resource; and
   confirm that all virtual sectors of the selected virtual resource have been overwritten.

18. The non-transitory computer readable storage medium of claim 17, wherein the computer readable code further configures the processor to:
   map the overwriting to a physical layer associated with the virtual sectors of the selected virtual resource.

19. The non-transitory computer readable storage medium of claim 17, wherein the computer readable code further configures the processor to:
   issue a certificate of sanitization indicating secure erasure of the selected virtual resource.

20. The non-transitory computer readable storage medium of claim 17, wherein the computer readable code further configures the processor to:
   dereference a unique identifier of the selected virtual resource, to disassociate a logical layer having the selected virtual resource from the physical layer.

21. The non-transitory computer readable storage medium of claim 17, wherein the computer readable code further configures the processor to:
   overwrite all virtual sectors of the selected virtual resource in compliance with a NIST 800-88 standard.

22. The non-transitory computer readable storage medium of claim 17, wherein the computer readable code further configures the processor to:
   confirm that all virtual sectors of the selected virtual resource have been overwritten using a hash value.

23. The non-transitory computer readable storage medium of claim 17, wherein the computer readable code further configures the processor to:
   receive a target host and user credentials.

24. The non-transitory computer readable storage medium of claim 17, wherein the computer readable code further configures the processor to:
   determine an environment processing capacity and throttle the overwriting based on the environment processing capacity.

25. The non-transitory computer readable storage medium of claim 17, wherein the computer readable code further configures the processor to:
   identify the virtual sectors based on usage in an environment distinguishing between allocation and usage.

* * * * *